Patented Oct. 26, 1954

2,692,889

UNITED STATES PATENT OFFICE 2,692,889

2-HALO-2-NITRO-1-ARYL-1-THIOCYANOALKANES

Arnold N. Johnson, Paterson, N. J., assignor to Commercial Solvents Corporation, Terre Haute, Ind., a corporation of Maryland No Drawing. Application April 17, 1953, Serial No. 349,576

7 Claims. (Cl. 260—454)

My invention relates to new compositions of matter, more particularly to the reaction product of the reaction between an aryldihalonitroalkane and an alkali metal thiocyanate.

My new compositions of matter are produced by reacting a 1,2-dihalo-2-nitro-1-arylalkane, wherein the aryl group is selected from the group consisting of phenyl and p-chlorophenyl and the halogens are selected from the group consisting of chlorine and bromine, with an alkali metal thiocyanate such as sodium thiocyanate or potassium thiocyanate in a solvent inert to this reaction such as benzene or toluene. The reaction is conducted at temperatures of from about 15° to about 110° C., by refluxing for from 1 to 12 hours, then adding to the reaction mixture an organic solvent in which the alkali metal thiocyanate is relatively soluble such as acetone, methyl ethyl ketone, and cyclohexanone, and continuing refluxing for an additional period of from 1 to 12 hours. The insoluble materials are then removed, and the desired monothiocyanate separated by evaporating the benzene solvent.

The 1,2-dihalo-2-nitro-1-arylalkanes suitable for producing my new compounds include 1,2-dichloro-2-nitro-1-phenylethane, 1,2 - dichloro-2-nitro-1-p-chlorophenylethane, 1,2 - dibromo - 2 - nitro-1-phenylethane, 1,2-dibromo-2-nitro-1-p-chlorophenylethane, 1,2 - dichloro - 2 - nitro - 1 - phenylpropane, 1,2-dichloro-2-nitro-1-p-chlorophenylpropane, 1,2 - dibromo-2-nitro-1-phenylpropane, 1,2-dibromo-2-nitro-1-p-chlorophenylpropane, 1,2 - dichloro-2-nitro-1-phenylbutane, 1,2-dichloro - 2 - nitro-1-p-chlorophenylbutane, 1,2-dibromo-2-nitro-1-phenylbutane, and 1,2-dibromo-2-nitro-1-p-chlorophenylbutane.

My new compounds are formed by reacting an alkali metal thiocyanate with the desired 1,2-dihalo-2-nitro-1-arylalkane. Examples of my new compounds thus formed are 2-chloro-2-nitro-1-phenyl-1-thiocyanoethane, 2-chloro-2-nitro-1-p-chlorophenyl-1-thiocyanoethane, 2-bromo-2-nitro-1-phenyl-1-thiocyanoethane, 2-bromo-2-nitro - 1 - p - chlorophenyl - 1 - thiocyanoethane, 2-chloro-2-nitro-1-phenyl-1-thiocyanopropane, 2-chloro-2-nitro-1-p-chlorophenyl - 1 - thiocyanopropane, 2-bromo-2-nitro-1-phenyl-1-thiocyanopropane, 2 - bromo-2-nitro-1-p-chlorophenyl-1-thiocyanopropane, 2-chloro-2-nitro-1-phenyl-1-thiocyanobutane, 2-chloro - 2 - nitro-1-p-chlorophenyl-1-thiocyanobutane, 2 - bromo-2-nitro-1-phenyl-1-thiocyanobutane, and 2-bromo-2-nitro-1-p-chlorophenyl-1-thiocyanobutane.

The aryldihalonitroalkanes employed as starting materials in my reaction can be prepared in any convenient manner. One method for the preparation of 1,2 - dibromo-2-nitro-1-phenylethane which I employ is as follows: To 2-nitro-1-phenylethene dissolved in a solvent inert to photochemical chlorination such as carbon tetrachloride or chloroform is added a solution of at least one mole of bromine in the same solvent per mole of arylnitroalkene. I prefer to add the bromine in small increments to the 2-nitro-1-phenylethene solution while exposing the mixture to a mercury, sun, or photoflood lamp and at a temperature of approximately 40° to 45° C., and to reflux the mixture in the presence of the lamp until the reaction ceases. When no further reaction occurs the reaction mixture is then evaporated on a steam bath to obtain 1,2-dibromo-2-nitro-1-phenylethane. The 1,2-dichloro-2-nitro-1-phenylethane can be produced in the same manner as the 1,2-dibromo-2-nitro-1-phenylethane above by substituting chlorine for the bromine there used. The compounds 1,2-dibromo-2 - nitro - 1 - p - chlorophenylethane and 1,2 - dichloro-2-nitro-1-p-chlorophenylethane can be produced by the same procedure outlined above for 1,2-dibromo-2-nitro-1-phenylethane and 1,2-dichloro-2-nitro-1-phenylethane by substituting 2-nitro-1-p-chlorophenylethene for the 2-nitro-1-phenylethene used as the starting material.

The same procedure with certain additions can be used to produce the 1,2-dibromo-2-nitro-1-phenylpropane and 1,2-dibromo-2-nitro-1-phenylbutane which I employ as starting materials. 2-nitro-1-phenylpropane or 2-nitro-1-phenyl-1-butene is dissolved in about four volumes of one of the same inert solvents. At least one mole of bromine per mole of phenylnitroalkene dissolved in about three volumes of the same solvent are added in small increments and the final mixture refluxed while exposed to a mercury, sun, or photoflood lamp. The solvent is evaporated on a steam bath when the reaction ceases. Then the residue is dissolved in from 5 to 50 volumes of fresh solvent and approximately five volumes of concentrated sulfuric acid is added to the mixture to remove unreacted 2-nitro-1-phenylalkene. The mixture is then agitated at 25° C. for approximately 15 minutes, allowed to settle, the layers separated, and the upper layer is steam distilled to recover the desired 1,2-dibromo-2-nitro-1-phenylalkane. The starting materials 1,2-dibromo-2-nitro-1-p-chlorophenylpropane can be produced from 2-nitro-1-p-chlorophenyl-1-propene, and the 1,2-dibromo-2-nitro-1-p-chlorophenylbutane can be produced from 2-nitro-1-p-chlorophenyl-1-butene by the same procedure as outlined above.

The 1,2-dichloro-2-nitro-1-phenylpropane and 1,2-dichloro-2-nitro-1-phenylbutane I employ as starting materials can be produced by the method set forth in my co-pending application Serial No. 349,577 filed this date entitled, "Process for Chlorinating Arylnitroalkenes."

The reaction producing my new compounds is carried out in the following manner. A mixture of the aryldihalonitroalkane and alkali metal thiocyanate reactants is prepared in about ten volumes of the inert solvent such as benzene or toluene. I can use from 1 to 3.5 moles of the alkali metal thiocyanate per mole of aryldihalonitroalkane. However, I prefer to minimize replacement of both halogen atoms by using only about 1 to 1.2 moles of the alkali metal thiocyanate per mole of aryldihalonitroalkane. I have also found it advantageous after an initial period of reflux of the starting mixture to add a like volume of a solvent for the thiocyanate salt such as acetone, methyl ethyl ketone, or cyclohexanone to increase the solubility of the alkali metal thiocyanate. This additional solvent can be added at one time or in increments during further refluxing. I have also found that this additional solvent can be added to the original reaction mixture before refluxing is begun, and in that way reduce the total refluxing period appreciably. After the reaction has gone essentially to completion as shown by the formation of a brown precipitate of polythiocyanogens the reaction mixture is cooled and any insoluble matter removed, either by settling and decantation or filtering. The solvent or solvents then present are evaporated and the residue obtained consists essentially of the desired 2-halo-2-nitro-1-aryl-1-thiocyanoalkane.

If additional purification is desired the residue can be triturated with about one-third the original volume of the benzene or toluene solvent, filtered to remove any remaining insoluble matter, and the solvent again evaporated. Still further purification can be obtained by triturating the last-mentioned residue in a solvent such as cyclohexane or petroleum hexane, filtering to remove any solids present, and evaporating the last-mentioned solvent to yield the desired 2-halo-2-nitro-1-aryl-1-thiocyanoalkane.

The following examples are offered to illustrate my invention and it is not intended that my invention be construed as limited to the ratios, amounts, or specific compounds shown therein.

EXAMPLE I

A mixture of 9.7 gm. (.031 mole) of 1,2-dibromo-2-nitro-1-phenylethane, 7.0 gm. (.086 mole) of sodium thiocyanate, and 400 ml. of benzene was refluxed for 5½ hours at 78° C. At the end of this period 150 ml. of acetone was added and the mixture refluxed for an additional 6 hours. An additional 150 ml. of acetone was then added and the solution refluxed for a final 6-hour period. The reaction mixture turned brown after standing overnight and some dark solids formed therein. The reaction mixture was diluted with water and the benzene layer which separated was decanted and evaporated from the benzene soluble residue. From this layer 5.1 gm. of brown oil was obtained which was largely the desired 2-bromo-2-nitro-1-phenyl-1-thiocyanoethane.

EXAMPLE II

A mixture of 49.5 gm. (.225 mole) of 1,2-dichloro-2-nitro-1-phenylethane, 21.0 gm. (.261 mole) of sodium thiocyanate, and 500 ml. of benzene was refluxed for 8 hours at approximately 80° C. Following this refluxing 300 ml. of acetone was added and the mixture refluxed an additional 8 hours. Then another 300 ml. portion of acetone was added and the mixture refluxed for a final 8-hour period. The mixture was filtered and the filtrate evaporated. The residue was triturated with 400 ml. of benzene, filtered, and the benzene filtrate evaporated to produce 20.1 gm. of a black oil containing 2-chloro-2-nitro-1-phenyl-1-thiocyanoethane.

EXAMPLE III

A mixture of 34.0 gm. (.133 mole) of 1,2-dichloro-2-nitro-1-p-chlorophenylethane, 11.3 gm. (.140 mole) of sodium thiocyanate, and 300 ml. of benzene was refluxed at approximately 80° C. for 8 hours. Then 150 ml. of acetone was added and the mixture refluxed an additional 8 hours. Another 150 ml. portion of acetone was added and the reaction mixture was refluxed for a final 8-hour period. The reaction mixture was filtered, evaporated, and triturated with approximately 200 ml. of benzene. The benzene solution was filtered and the benzene was evaporated to yield 22.7 gm. of black oil containing 2-chloro-2-nitro-1-p-chlorophenyl-1-thiocyanoethane.

EXAMPLE IV

A mixture of 51.8 gm. (.150 mole) of 1,2-dibromo-2-nitro-1-p-chlorophenylethane, 12.8 gm. (.158 mole) of sodium thiocyanate, and 400 ml. of benzene was refluxed for 16 hours at approximately 80° C. A 500-ml. portion of acetone was added and the mixture refluxed for an additional 12 hours. The mixture was cooled to room temperature and filtered. The filtrate was evaporated. To the black oil remaining was added 321 gm. of benzene and the mixture heated to 55° C. The mixture was filtered to remove a benzene-insoluble precipitate and the filtrate evaporated. From this filtrate 12.6 gm. of a brown solid, M. P. 60° to 62° C., was recrystallized from aqueous methanol. The recrystallized solid consisted essentially of 2-bromo-2-nitro-1-p-chlorophenyl-1-thiocyanoethane.

EXAMPLE V

A mixture of 24.5 gm. (.073 mole) of 1,2-dibromo-2-nitro-1-phenylbutane, 6.3 gm. (.078 mole) of sodium thiocyanate, 300 ml. of benzene, and 300 ml. of acetone was refluxed at a temperature of approximately 70° C. for 3 hours. The mixture was allowed to settle and was filtered to remove the 8.1 gm. of insoluble matter formed. The solution was evaporated to dryness and the residue was dissolved in 100 ml. of benzene. Insoluble matter of 3.7 gm. was again filtered out and the solvent evaporated. The residue was triturated in 60 ml. of cyclohexane, the 1.5 gm. of insoluble matter was removed by filtering, and the cyclohexane solvent evaporated to yield 16.1 gm. of a yellow oil containing 2-bromo-2-nitro-1-phenyl-1-thiocyanobutane.

My new compounds are all effective miticides. The results of tests conducted with some of these compounds are set forth in the table below. The samples tested were the oily residues just as obtained in each example above cited without further purification. The testing procedure employed was as follows. The compounds were formulated in acetone, absorbed on Attaclay, a hydrated aluminum-magnesium silicate absorbent clay produced by Attapulgus Clay Co. Inc., then blended to a dry powder by mortar and pestle, and tested as a wettable powder dusted on leaves infested with *Tetranychus atlanticus* mite colonies.

Table

| Compound | Derived In— | Percent Kill at 72 hours with Concentrations of— | | |
| --- | --- | --- | --- | --- |
| | | 1.0% | 0.5% | 0.1% |
| 2-bromo-2-nitro-1-phenyl-1-thio-cyanoethane. | Example I | 100 | | 95 |
| 2-bromo-2-nitro-1-p-chloro-phenyl-1-thiocyanoethane. | Example IV | 100 | | 60 |
| 2-chloro-2-nitro-1-phenyl-1-thiocyanoethane. | Example II | | 90 | 0 |
| 2-chloro-2-nitro-1-p-chloro-phenyl-1-thiocyanoethane. | Example III | | 100 | 50 |
| 2-bromo-2-nitro-1-phenyl-1-thio-cyanobutane. | Example V | | 100 | 50 |

Now having described my invention what I claim is:

1. The product of the reaction of an alkali metal thiocyanate with a 1,2-dihalo-2-nitro-1-arylalkane which product is represented by the formula:

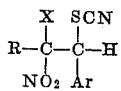

wherein X is a halogen selected from the group consisting of chlorine and bromine, Ar is a radical selected from the group consisting of phenyl and p-chlorophenyl, and R is a radical selected from the group consisting of hydrogen, methyl, and ethyl.

2. 2 - bromo - 2 - nitro-1-phenyl-1-thiocyanoethane.

3. 2 - bromo-2-nitro-1-p-chlorophenyl-1-thiocyanoethane.

4. 2 - chloro - 2 - nitro-1-phenyl-1-thiocyanoethane.

5. 2 - chloro-2-nitro-1-p-chlorophenyl-1-thiocyanoethane.

6. 2 - bromo - 2 - nitro-1-phenyl-1-thiocyanobutane.

7. The product of the reaction of approximately equimolar quantities of an alkali metal thiocyanate and a 1,2-dihalo-2-nitro-1-arylalkane represented by the formula:

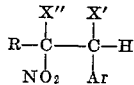

wherein X' and X'' are the same halogen selected from the group consisting of chlorine and bromine, Ar is a radical selected from the group consisting of phenyl and p-chlorophenyl, and R is a radical selected from the group consisting of hydrogen, methyl, and ethyl, which product is represented by the general formula:

wherein X is selected from the group consisting of chlorine and bromine, and Ar and R are radicals selected from the same groups as set forth above.

References Cited in the file of this patent

UNITED STATES PATENTS

| Number | Name | Date |
| --- | --- | --- |
| 2,573,973 | Johnson et al. | Nov. 6, 1951 |